United States Patent
Ryan, III et al.

(10) Patent No.: US 7,090,175 B1
(45) Date of Patent: Aug. 15, 2006

(54) INSULATING WIRE SEPARATOR APPARATUS FOR PIPING SYSTEMS

(76) Inventors: John J. Ryan, III, 6 Boxwood La., Montgomery, NY (US) 12549; Julius Martin, 6 Boxwood La., Montgomery, NY (US) 12549

(*) Notice: Subject to any disclaimer, the term of this patent is extended or adjusted under 35 U.S.C. 154(b) by 83 days.

(21) Appl. No.: 09/866,593

(22) Filed: May 30, 2001

Related U.S. Application Data

(60) Provisional application No. 60/255,119, filed on Dec. 14, 2000.

(51) Int. Cl.
*F16L 3/22* (2006.01)

(52) U.S. Cl. ................................. 248/68.1; 248/74.1

(58) Field of Classification Search ............ 248/68.1, 248/74.2, 229.1, 229.16, 229.14, 229.26, 248/218.4, 230.5, 230.7, 231.81, 231.85, 248/316.6, 316.7, 316.8
See application file for complete search history.

(56) References Cited

U.S. PATENT DOCUMENTS

| | | | | |
|---|---|---|---|---|
| 1,537,772 A * | 5/1925 | Hitzler | ..................... | 248/279.1 |
| 3,385,545 A * | 5/1968 | Patton | ..................... | 248/228.5 |
| 3,568,964 A * | 3/1971 | Perkins | ..................... | 174/156 |
| 3,884,438 A * | 5/1975 | Logsdon | ..................... | 248/230.7 |
| 3,907,239 A * | 9/1975 | Ehrlich | ..................... | 24/339 |
| 4,771,137 A * | 9/1988 | Thompson | ..................... | 174/163 F |
| 4,819,903 A * | 4/1989 | Jimenez | ..................... | 248/229.16 |
| 4,890,805 A * | 1/1990 | Morita | ..................... | 24/453 |
| 5,018,260 A * | 5/1991 | Ziu | ..................... | 138/108 |
| 5,058,838 A * | 10/1991 | Velke et al. | ..................... | 174/138 H |
| 5,577,697 A * | 11/1996 | Accordino | ..................... | 248/206.5 |
| 5,601,260 A * | 2/1997 | Shinohara et al. | ..................... | 248/68.1 |
| 5,644,106 A * | 7/1997 | Gajeski et al. | ..................... | 174/138 G |
| 5,772,166 A * | 6/1998 | Adams | ..................... | 248/229.16 |
| 6,227,510 B1 * | 5/2001 | McMullen, Sr. | ..................... | 248/230.5 |
| 6,513,767 B1 * | 2/2003 | Rodgers | ..................... | 248/74.2 |
| 6,513,772 B1 * | 2/2003 | Gary et al. | ..................... | 248/231.91 |
| 2002/0190166 A1 * | 12/2002 | Bagdi | ..................... | 248/71 |

* cited by examiner

*Primary Examiner*—Ramon O Ramirez
(74) *Attorney, Agent, or Firm*—Krieg DeVault LLP

(57) ABSTRACT

An insulating wire separator for piping systems which protects buried pipes and cable from becoming damaged or melted from an accidental electrical charge, or caused by a lightning strike. The insulating wire separator is a multi-purpose clip device used to connect a tracer wire to conduits, cables, or piping. Tracer wires are used to permit detection of buried plastic conduits, cables, or piping using conventional detection methods. The insulating wire separator includes a main conduit receiving portion having an outer strengthening rib. The insulating wire separator includes an arm portion connected to a wire clip portion. Along the arm portion, near the main conduit receiving portion, is a plate portion. The insulating wire separator can be installed on either side or on top of conduits, cables, or piping. The insulating wire separator is preferably composed of a resilient material such as plastic or rubber, so that the insulating wire separator can be resiliently deformed to receive conduits, cables, or piping as well as tracer wires. The insulating wire separator is preferably color coded, with a different color used for each utility.

19 Claims, 4 Drawing Sheets

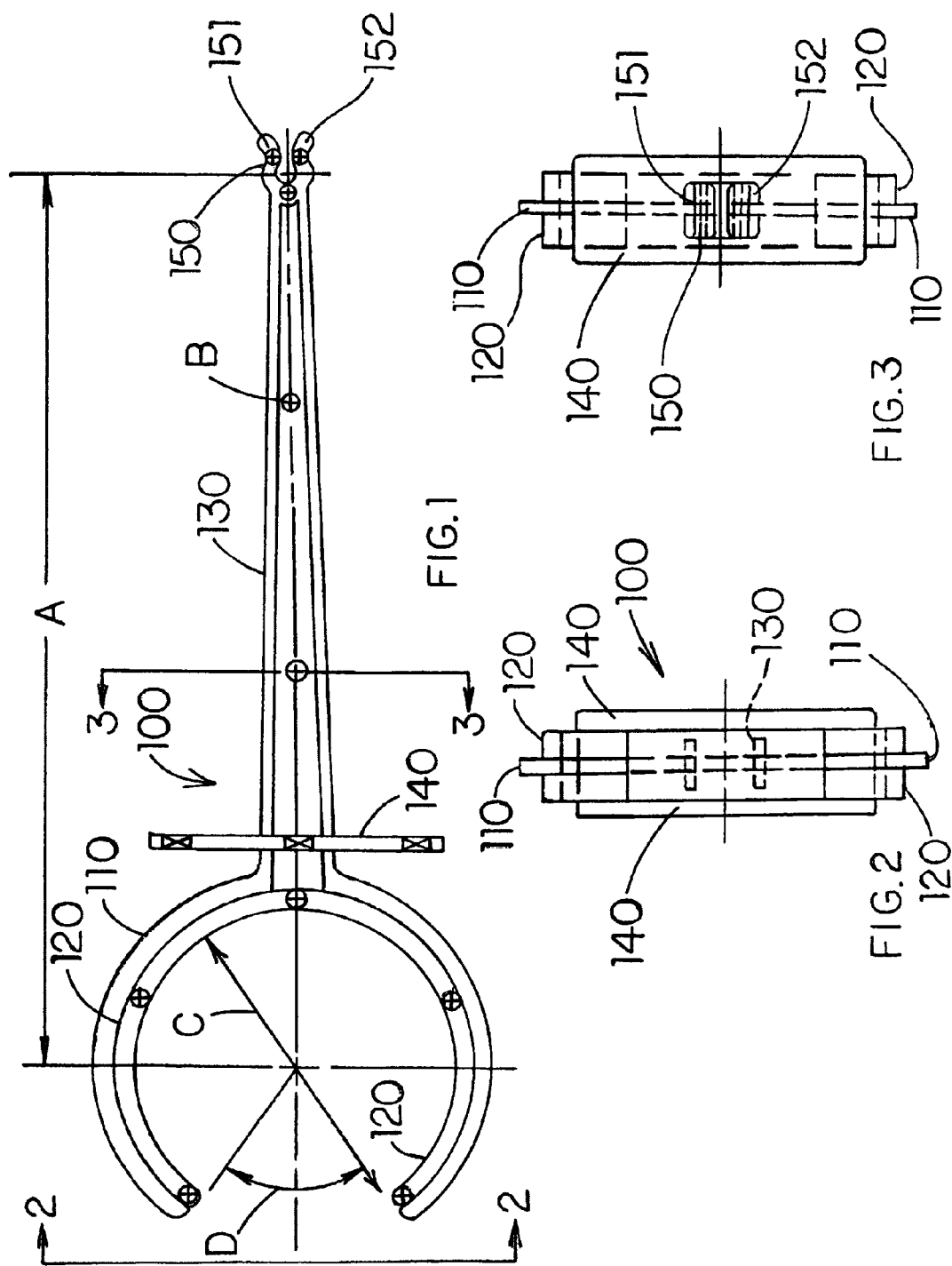

INSULATING WIRE SEPARATOR APPARATUS FOR PIPING SYSTEMS

CROSS REFERENCE TO RELATED APPLICATIONS

This Utility patent application claims priority of Provisional Patent Application 60/255,119 filed Dec. 14, 2000, and is incorporated by reference herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to an insulating wire separator apparatus for piping systems. More particularly, the invention relates to an insulating wire separator apparatus for piping systems having an improved construction and structure, to protect buried pipes and cable from becoming damaged or melted from an accidental electrical charge or a lightning strike.

2. Description of the Prior Art

Devices are known for use in attaching wires to pipe. Such wires are used as tracer wire, so as to permit detection of underground buried plastic piping systems.

U.S. Pat. No. 6,061,880 to Senninger teaches a water supply line fastener. In this device, a large pipe clip and smaller clips are shown attached to an arm.

U.S. Pat. No. 3,385,545 to Patton teaches a conduit hanging apparatus. The apparatus includes a pair of brackets securing a pipe in the middle, and for securing additional cables on either side.

U.S. Pat. No. 5,669,590 to Przewodek teaches a retaining clip with multiple clamps. In this patent, plastic clips are used to secure and anchor pipe and wire bundles.

U.S. Pat. No. 5,035,383 to Rainville teaches a space saver service clamp. In this patent, a support member has clamp portions for retaining three separate pipes or wire bundles.

U.S. Pat. No. 5,271,587 to Schaty et al. teaches a clip for pipes and cables. In this device, resilient support members are provided.

U.S. Pat. No. 5,538,208 to Cordes et al. teaches a spacer mounting for elongated elements such as electrical cable bundles. In this patent, a mounting structure includes a snap on feature.

U.S. Pat. No. 5,769,556 to Colley teaches a bicycle clamp. This device includes a pair of clamp portions to connect a bicycle rack to a bicycle frame portion.

U.S. Pat. No. 4,114,241 to Bisping teaches interlocking clamps for piping and cable. In this patent, block-like members are engageable using dovetail-like joints.

U.S. Pat. No. 5,703,330 to Kujawski teaches a wire harness conduit and tube bundle. A large conduit-engaging portion supports a plurality of smaller tube holder portions.

U.S. Pat. No. 5,115,542 to Gehres teaches a hose separator clip. A pair of separable portions can be engaged to clamp three pipes at spaced intervals.

U.S. Pat. No. 4,707,892 to Nelson teaches a fish rod transport clamp. This clamp has receptacles for four rods.

BRIEF SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides an insulating wire separator apparatus for piping systems.

More particularly, the invention relates to an insulating wire separator apparatus for piping systems having an improved construction and structure, to protect buried pipes and cable from becoming damaged or melted from an accidental electrical charge or a lightning strike.

An insulating wire separator for piping systems protects buried pipes and cable from becoming damaged or melted from an accidental electrical charge or a lightning strike. The insulating wire separator apparatus is a multi-purpose clip device used to connect a tracer wire to conduits, cables, or piping. The charge put on the tracer wire ("locating wire") for locating purposes is about equal to that of an AM radio. This is especially useful for locating buried conduits, cables, or piping which are composed of plastic materials. The insulating wire separator spaces the tracer wires away from buried plastic conduits, cables, or piping during the installation or back filling process to prevent the plastic conduits, cables, or piping from being melted or damaged due to an accidental electric charge placed upon the wire by electric wires in a joint trench installation, or by a lightning strike. Without this insulating wire separator, an incident such as this could be devastating and could result in loss of life or property.

Another purpose of the insulating wire separator is to keep uniform placement of the locating ("tracer") wire throughout utility systems. By using this insulating wire separator, the wire will always be within six inches (for example) of the piping and will not significantly move during the backfilling process. This should greatly improve the accuracy of locating underground piping, thereby reducing the amount of third party damage ("dig-ins") of utility mains and services due to mismarked utilities.

Furthermore, such buried plastic conduits, cables, or piping are difficult to detect, and construction crews may inadvertently strike and damage such buried conduits, cables, or piping because conventional detection methods using metal detecting equipment are unable to locate buried plastic conduits, cables, or piping. Such tracer wires are used, therefore, to permit detection of buried plastic conduits, cables, or piping using conventional detection methods.

Additionally, the insulating wire separator ensures that the locating wire will stay in close proximity to the plastic conduits, cables, or piping, but not touching (e.g., several inches away), which meets the specified tolerance zone requirements for most states "one call system" for locating underground facilities.

The insulating wire separator of the present invention includes a main conduit receiving portion having an outer strengthening rib. The insulating wire separator includes an arm portion connected to a wire clip portion. Along the arm portion, near the main conduit receiving portion, is a plate and earth anchor portion.

The insulating wire separator can be installed on either side of conduits, cables, or piping, or on top. The conduits, cables, or piping are received in the main conduit receiving portion. The insulating wire separator is preferably composed of a non-conductive resilient material such as plastic or rubber, so that the insulating wire separator can be resiliently deformed to receive conduits, cables, or piping as well as tracer wires.

Other objects and advantages of the present invention will be more readily apparent from the following detailed description when read in conjunction with the accompanying drawings.

FIG. 1 is a front elevational view of an insulating wire separator apparatus according to the present invention attached to a conduit, cable or piping.

FIG. 2 is an end view of the insulating wire separator apparatus, taken along lines 2—2 in FIG. 1.

FIG. 3 is an end view of the insulating wire separator apparatus of FIG. 1, taken along lines 3—3 in FIG. 1.

DETAILED DESCRIPTION OF THE INVENTION

Figure 4:
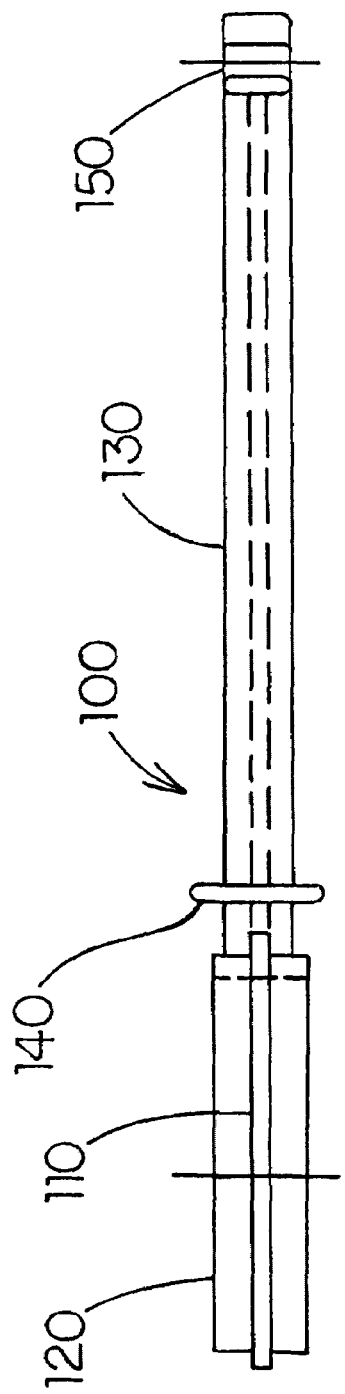
FIG. 4 is a top elevational fragmentary view of the insulating wire separator shown in FIG. 1.

FIG. 1 shows an insulating wire separator 100 for piping systems, having an improved construction and structure as compared with the prior art devices, to protect buried pipes and cable from becoming damaged or melted from an accidental electrical charge, or a lightning strike. The insulating wire separator 100 is a multi-purpose clip device used to connect a tracer wire 170 to conduits 180, cables, or piping. The charge put on the tracer wire 170 (locating wire) for locating purposes is about equal to that of an AM radio. This is especially useful for locating buried conduits, cables, or piping which are composed of plastic materials.

The insulating wire separator 100 spaces the tracer wire 170 away from buried plastic conduits 180, cables, or piping during the installation or backfilling process to prevent the plastic conduits 180, cables, or piping from being melted or damaged due to an accidental electric charge placed upon the tracer wire 170 by electric wires in a joint trench installation, or by a lightning strike. Without this insulating wire separator 100, an incident such as this could be devastating and could result in loss of life or property.

Another purpose of the insulating wire separator 100 is to keep uniform placement of the locating ("tracer") wire 170 throughout utility systems. By using this insulating wire separator 100, the tracer wire 170 will consistently be several inches, preferably about six inches (for example), from the conduit 180 or piping and will not substantially move during the backfilling process. This will greatly improve the accuracy of locating underground piping, thereby reducing the amount of third party damage ("digins") of utility mains and services due to mismarked utilities.

Furthermore, such buried plastic conduits 180, cables, or piping are difficult to detect, and construction crews may inadvertently strike and damage such buried conduits, cables, or piping because conventional detection methods using metal detecting equipment are unable to locate buried plastic conduits 180, cables, or piping. Such tracer wires 170 are used, therefore, to permit detection of buried plastic conduits 180, cables, or piping using conventional detection methods.

Additionally, the insulating wire separator 100 ensures that the tracer locating wire 170 will stay in close proximity to the plastic conduits, cables, or piping, but not touching (e.g., several inches away), which meets the specified tolerance zone requirements for most state's "one call system" for locating underground facilities. Preferably, the tracer locating wire 170 is spaced about six inches away from the main conduit 180.

The insulating wire separator 100 shown in FIG. 1 includes a main conduit receiving portion 120 having an outer strengthening rib 110. The main conduit receiving portion 120 is preferably sized to resiliently receive the main conduit 180 through an opening D provided in the main conduit receiving portion 120. The opening D extends about the outer circumference of the main conduit receiving portion 120, and preferably extends from sixty to eighty degrees from the centerline of the main conduit receiving portion 120, to allow the main conduit 180 to be flexibly received through said opening D.

The insulating wire separator apparatus 100 includes an arm portion 130 extending from the main conduit receiving portion 120, on the side opposite of the opening D in the main conduit receiving portion 120. A plate and earth anchor portion 140 is positioned at right angles to the arm portion 130, in proximity to the conduit receiving portion 120.

The insulating wires separator 100 can be installed on either side, or on top of existing conduits 180, cables, or piping. At least one of the conduits 180, cables, or piping is received in the main conduit receiving portion 120. The insulating wire separator 100 is preferably composed of a resilient material such as plastic or rubber, so that the insulating wire separator 100 can be resiliently deformed to receive at least one conduit 180, cable, or piping therein. A tracer wire 170 is received between opposing fingers of a tracer wire clip portion 150, which is positioned on the arm portion 130 at least three inches, and preferably six inches away from the centerline of the main conduit 180.

The insulating wire separator apparatus 100 is preferably made of a resilient, non-conductive, non-corrosive, non-biodegradable material.

Figure 6:
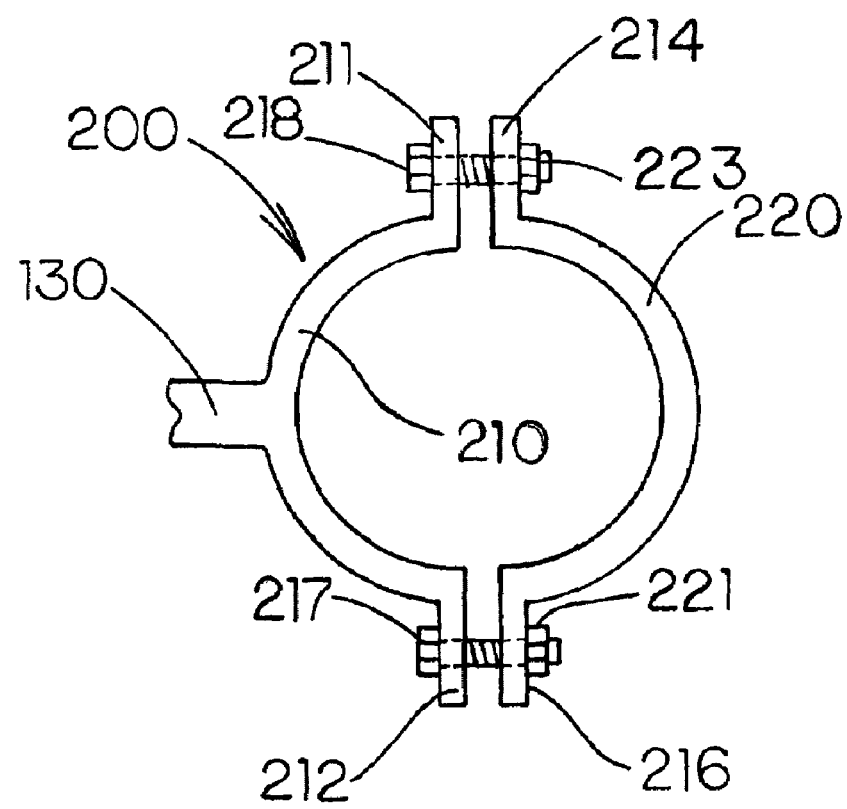
FIG. 6 is a side view of an alternative form of the main conduit receiving portion, having a radiused first half and a radiused second half releasably secured with a releasable fastening means.

The insulating wire separator 100 is applied to conduits 180, cables, or piping by pressing or deforming the main conduit receiving portion 120 so that it opens sufficiently to receive at least one conduit 180, cable, or piping therein, and then resiliently closes to grip the conduit 180, cable, or piping to which it is applied. The insulating wire separator apparatus 100 may alternately include a conduit receiving portion having a first half 210 and a second half 220, which are releasably secured together by any known type of releasable securement means, as shown in FIG. 6.

The tracer wire 170 is inserted and retained in the opposing fingers 151, 152 of the wire clip portion 150. As seen in FIG. 1, the wire clip portion 150 includes a pair of fingers 151 and 152 which open sufficiently to receive the tracer wire 170, and then resiliently close to grip the tracer wire 170 which has been inserted therein. The wire clip portion 150 may be located upon the arm portion 130, midway between the main conduit receiving portion 120 and the separator post 160, as shown in FIG. 7. Alternately, As shown in FIG. 1, the wire clip portion 150 may be located at the distal end of the arm portion 130, several inches from the main conduit receiving portion 120.

Figure 7A:
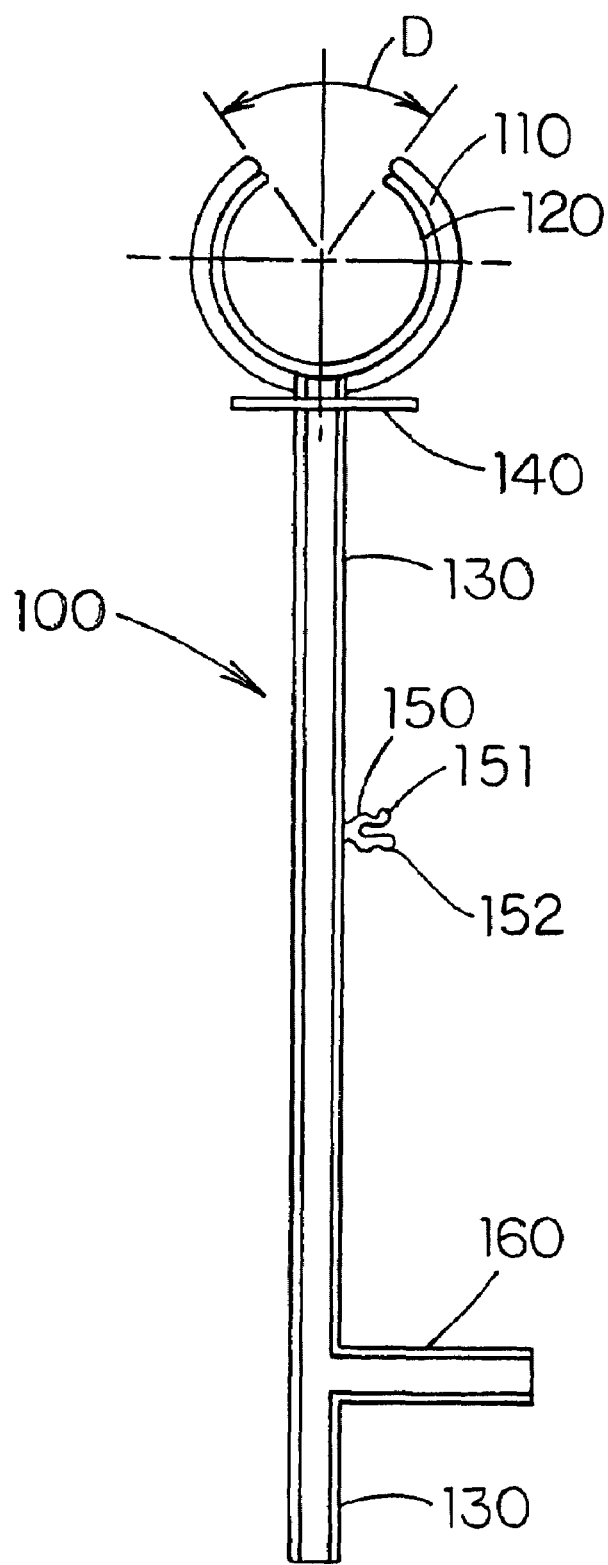
FIG. 7A is a side elevational view of an alternative form of the main conduit receiving apparatus of FIG. 1, showing a separator post mounted on the arm portion, with the wire clip portion positioned midway between the main conduit receiving portion and the separator post.
Figure 7B:
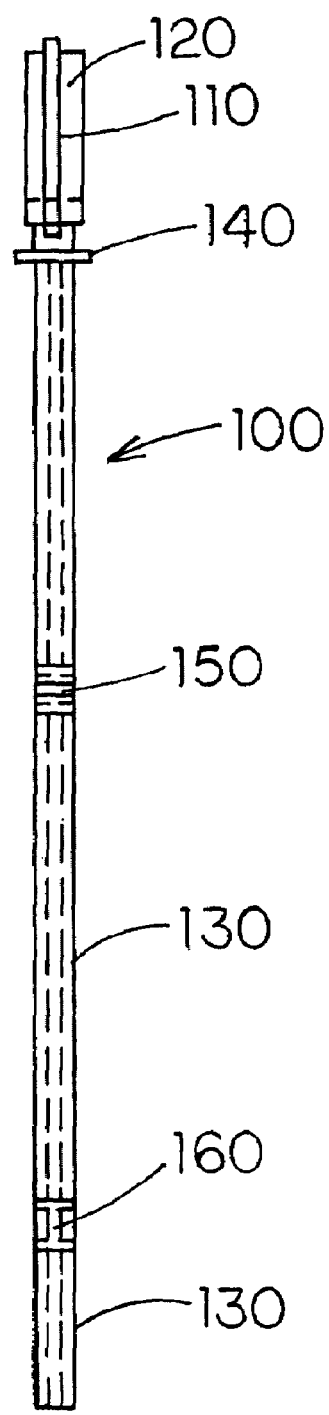
FIG. 7B is a top view of the alternative form of the main conduit receiving apparatus shown in FIG. 7A.

When a separator post 160 is used, as shown in FIG. 7A and FIG. 7B, the separator post 160, is positioned upon the arm portion 130, at least ten inches from the main conduit receiving portion 120. The separator post 160 preferably extends at least two inches above the arm portion 130.

Figure 8:
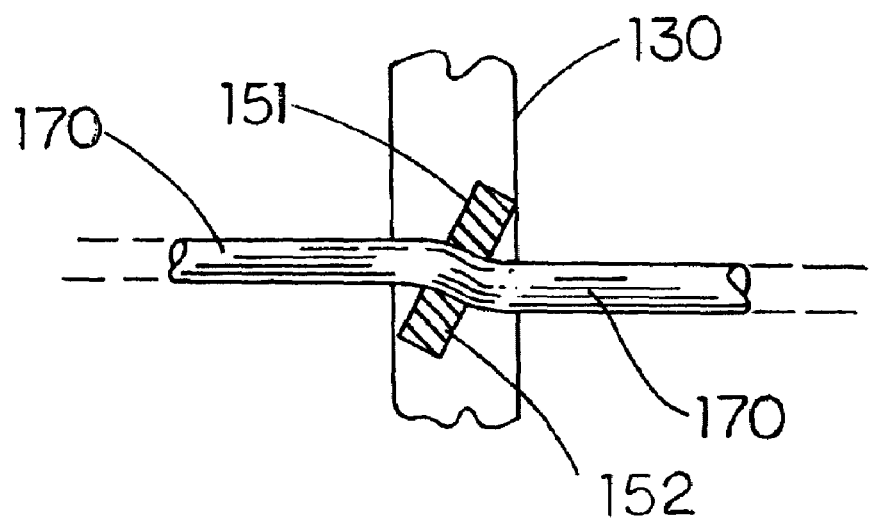
FIG. 8 is a sectional view through the wire clip portion of the main conduit receiving portion shown in FIG. 1 and FIG. 7.

The pair of fingers 151 and 152 may be placed at an angle in relation to the centerline of the arm portion 130, to slightly deform the tracer wire 170, as shown in FIG. 8. Preferably, the angle is from three degrees to thirty degrees tangent to the centerline of the arm portion 130. This allows several sizes of wire to be inserted into the wire clip portion 150 and held therein, while preventing the tracer wire 170 from slipping or sagging during installation and backfilling operations.

By way of example, preferred dimensions are provided in FIG. 1, for the insulating wire separator 100 of FIG. 1, as follows. The distance A is from six inches to ten inches long, The elements B (only one of which is marked in FIG. 1) are where KO pins are located during the manufacturing process. The radius C is sized to receive the main conduit 180 therein. The angle D is preferably from sixty to eighty degrees.

As previously noted, these dimensions are representative of a preferred embodiment, and one of average skill in this art may modify these dimensions without departing from the scope of this invention, and such modifications are intended to fall within the scope of the following claims.

FIG. 2 is an end view of the insulating wire separator 100 of FIG. 1. In this view, the visible elements include the outer strengthening rib 110, the main conduit receiving portion 120, and the plate portion 140.

FIG. 3 is an end view of the insulating wire separator 100 of FIG. 1. In this view, the visible elements include the outer strengthening rib 110, the main conduit receiving portion 120, the arm portion 130, the plate portion 140, and the wire clip portion 150 including the pair of fingers 151 and 152 of the wire clip portion 150.

FIG. 4 is a top elevational view of the insulating wire separator 100 of FIG. 1. In this view, the visible elements include the outer strengthening rib 110, the main conduit receiving portion 120, the arm portion 130, the plate and earth anchor portion 140, and the wire clip portion 150.

Figure 5:
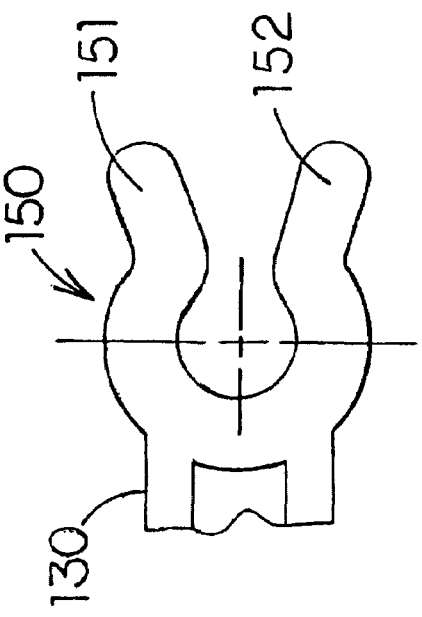
FIG. 5 is an enlarged view of the wire clip portion of the insulating wire separator of FIG. 1.

FIG. 5 is an enlarged view of a wire clip portion 150 of the insulating wire separator 100 of FIG. 1. In this view, the pair of fingers 151 and 152 is clearly seen. The fingers 151 and 152 are resilient, and sized to receive a tracer wire 170 therein. The tips of the fingers 151 and 152 are angled outwardly, for ease of insertion of the tracer wire 170.

FIG. 6 is a side elevational view of an alternative means to connect the insulating wire separator apparatus 100 to the main conduit 180. This view is similar to the main conduit receiving portion 120 of FIG. 1, and has an arm portion 130 (partially broken away in FIG. 6) corresponding to the arm portion 130 of FIG. 1. The main conduit receiving portion 100 includes a first radiused half 210 and a second radiused half 220, each having respective extending flange portions 211, 212, 214, 216, secured together by a releasable fastener, such as threaded fasteners 217, 218 having respective nuts 221, 223. Any known releasable fastener may be used, without departing from the scope of this disclosure, or from the following claims.

FIG. 7A is a side view of the insulating wire separator apparatus 100, with a separator post 160 extending from the arm portion 130 at right angles. The separator post 160 preferably extends at least two inches above the arm portion 130. The separator post 160 is located at least ten inches from said plate portion 140, and the arm portion 130 preferably extends at least two inches beyond the separator post 160, to provide safe spacing for additional underground utilities. When a separator post 160 is used, the wire clip portion 150 is located midway between the plate and earth anchor portion 140 and the separator post 160, to space the tracer wire 170 between the main conduit 180 and additional underground utilities. This ensures a safe distance between underground utilities in a common trench. The insulating wire separating apparatus 100 disclosed herein, ensures that the distance between the tracer wire 170 and the main conduit wire 180, or other utilities, will be maintained during the backfilling process.

FIG. 7B is a top view of the insulating wire separator apparatus 100 shown in FIG. 7A. The wire clip portion 150 is located midway between the main conduit receiving portion 122 and the separator post 160. Note that the arm portion 130 extends at least two inches beyond the separator post 160, to support other utilities in spaced relation from the tracer wire 170.

Preferably, the insulating wire separator apparatus 100 is color coded, with a different color for each utility, such as water, electrical, sewage, TV cable, etc., for easy identification when exposed by a contractor digging around existing facilities.

FIG. 8 is a sectional view through the wire clip portion 150. In this view, the wire clip portion 150 is canted from three degrees to thirty degrees in relation to the centerline of the arm portion 130, which slightly bends the tracer wire 170 passing therethrough. The purpose of this embodiment, is to adapt the wire clip portion 150 for use with any one of several sizes of tracer wire 170, and to more tightly stretch the tracer wire 170 between adjacent ones of the insulating wire separator apparatus 100 strung along the conduit 180, pipe, or cable. This tensioning effect will ensure that the tracer wire 170 is not displaced very much during filling-in operations which bury the conduits 180, pipes, and cables in a common trench (not shown).

The invention being thus described, it will be evident that the same may be varied in many ways. Such variations are not to be regarded as a departure from the spirit and scope of the invention and all such modifications are intended to be included within the scope of the claims.

We claim:

1. An insulating wire separator apparatus for separating a tracer wire a safe electrically insulative distance from a main conduit in a trench prior to back-filling comprising:
   a) an elongated body having opposite ends, a resilient, main conduit receiving portion at one of said opposite ends having an inner radius sized to receive said main conduit therein, an opening into said main conduit receiving portion facing away from the remainder of said body and sized to flex about said main conduit, and a pair of conduit engaging sliding wedge surfaces on opposite sides of said opening which engage said main conduit to flex said main conduit receiving portion to expand said opening and position said main conduit within said main conduit receiving portion upon the application of force between said main conduit and said conduit engaging sliding wedge surfaces of said main conduit receiving portion;

b) an arm portion of said body extending away from said main conduit receiving portion on a side opposite said opening, said arm portion extending to the other of said opposite ends, an electrically insulative safe distance beyond said main conduit receiving portion;

c) a plate and earth anchor portion extending generally perpendicularly from said arm portion in proximity to said conduit receiving portion whereby said force may be applied between said conduit engaging sliding wedge surfaces and said main conduit to flex said main conduit receiving portion and expand said opening to position said main conduit in said main conduit receiving portion and to resist rotation of said wire separator apparatus about said main conduit after back-filling; and d) a tracer wire clip portion for receiving a tracer wire therein, said tracer wire clip portion being positioned on said arm portion adjacent to said other end to position the tracer wire said safe distance from said main conduit receiving portion and said conduit therein to protect said conduit from being damaged.

2. The insulating wire separator apparatus of claim 1, wherein the insulating wire separator apparatus is made of a resilient, nonconductive, noncorrosive, nonbiodegradable material.

3. The insulating wire separator apparatus of claim 1, wherein a separator post extends at right angles from said arm portion, said separator post spaced at least ten inches from said plate portion; and said arm portion extends at least two inches beyond said separator post, to provide safe spacing for additional underground utilities in a common trench location.

4. The insulating wire separator apparatus of claim 1, wherein said body is color coded, with a separate color used for each utility.

5. The insulating wire separator apparatus of claim 1, wherein the tracer wire clip portion is located at said other of said opposite ends.

6. The insulating wire separator apparatus of claim 1, wherein the opening in the resilient, main conduit receiving portion is from sixty to eighty degrees from the centerline of the main conduit.

7. The insulating wire separator apparatus of claim 1, wherein the tracer wire clip finger portion is angled from three to thirty degrees from the centerline of said arm portion to engage varying sizes of tracer wire therein.

8. The insulating wire separator apparatus of claim 1, wherein the main conduit receiving portion comprises an inner radius having a first half portion, with a second half portion releasably secured to said first half portion by a releasable fastener.

9. The insulating wire apparatus of claim 1 further comprising a separator post extending generally perpendicularly from said arm portion in proximity to said tracer wire clip portion.

10. The insulating wire separator apparatus of claim 9, wherein said arm portion extends at least two inches beyond said separator post to provide safe spacing for additional underground utilities in a common trench location.

11. The insulating wire apparatus of claim 1 wherein said main conduit receiving portion has an outwardly extending strengthening rib which extends between said conduit engaging sliding wedge surfaces and said arm portion.

12. The insulating wire separator apparatus of claim 11, wherein said body is color-coded with a separate color used for each utility.

13. The insulating wire separator apparatus of claim 11, wherein the tracer wire clip portion is located at said other of said opposite ends.

14. The insulating wire separator apparatus of claim 11, wherein the opening provided in the resilient, main conduit receiving portion is from sixty to eighty degrees from the centerline of the main conduit.

15. The insulating wire separator apparatus of claim 11, wherein the tracer wire clip finger portion is angled from three to thirty degrees from the centerline of said arm portion to engage varying sizes of tracer wire therein.

16. The insulating wire separator apparatus of claim 11, wherein the main conduit receiving portion comprises an inner radius having a first half radiused portion, with a second half radiused portion releasably secured to said first half radiused portion by a releasable fastener.

17. The insulating wire apparatus of claim 1 wherein said tracer wire clip portion has a pair of fingers for receiving a tracer wire therebetween.

18. The insulating wire separator apparatus of claim 17, wherein the tracer wire clip finger portion is angled from three to thirty degrees from the centerline of said arm portion to engage varying sizes of tracer wire therein.

19. The insulating wire separator apparatus of claim 17, wherein said body is color-coded, with a separate color used for each utility.

* * * * *